United States Patent
Limberg et al.

(10) Patent No.: US 6,621,527 B1
(45) Date of Patent: Sep. 16, 2003

(54) DIGITAL RECEIVER WITH MATCH FILTER RESPONSIVE TO FIELD SYNCHRONIZATION CODE IN THE FINAL I-F SIGNAL ENVELOPE

(75) Inventors: Allen LeRoy Limberg, Vienna, VA (US); Jung-Wan Ko, Yongin (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/229,606

(22) Filed: Jan. 13, 1999

Related U.S. Application Data

(63) Continuation-in-part of application No. 08/746,294, filed on Nov. 7, 1996.

(51) Int. Cl.$^7$ ............................................. H04N 5/446
(52) U.S. Cl. ..................... 348/725; 348/726; 348/723; 348/526; 348/21
(58) Field of Search ............................... 348/725, 726, 348/723, 724, 729, 731, 21, 525, 526; 375/368, 366, 343, 354

(56) References Cited

U.S. PATENT DOCUMENTS

| | | | | |
|---|---|---|---|---|
| 4,774,686 A | * | 9/1988 | McClary et al. ............ 708/490 |
| 5,487,186 A | * | 1/1996 | Scarpa ..................... 455/192.2 |
| 5,511,099 A | * | 4/1996 | Ko et al. .................... 375/368 |
| 5,534,933 A | * | 7/1996 | Yang ....................... 375/240.01 |
| 5,570,136 A | * | 10/1996 | Kim ............................ 348/725 |
| 5,588,025 A | * | 12/1996 | Strolle et al. ............... 375/316 |
| 5,594,506 A | * | 1/1997 | Yang ........................... 348/531 |
| 5,648,987 A | * | 7/1997 | Yang et al. .................. 375/232 |
| 5,661,528 A | * | 8/1997 | Han ............................. 348/607 |
| 5,673,293 A | * | 9/1997 | Scarpa et al. ............... 375/321 |
| 5,724,396 A | * | 3/1998 | Claydon et al. ............. 375/355 |
| 6,104,442 A | * | 8/2000 | Patel et al. ................. 348/725 |

* cited by examiner

*Primary Examiner*—John Miller
*Assistant Examiner*—Jean W. Désir
(74) *Attorney, Agent, or Firm*—Robert E. Bushnell, Esq.

(57) ABSTRACT

A radio receiver for receiving a selected digital TV signal uses final intermediate frequency signals the carrier frequencies of which are multiples of symbol rate. The radio receiver has a match filter receptive of rectified samples of digitized intermediate-frequency signal and responsive to the amplitude of the intermediate-frequency carrier being modulated in accordance with the field synchronization code group to generate a pulsed response to the beginning of each data field. This pulsed response is used to determine when data segment synchronization information should occur, so its detection is more certain to be accurate and data segment synchronization is more rapidly determined. Symbol synchronization is rapidly inferred from the field synchronization and data segment synchronization, so that the samples in each data line can be counted. The complex carrier frequencies of the final intermediate frequency signals are generated in response to the samples per data line count, for implementing synchronous detection to baseband. The adjustment of the carrier frequency of the final intermediate frequency signal to be a prescribed multiple of symbol rate is done in response to an automatic-frequency-and-phase-control signal developed from the synchronous detection results.

26 Claims, 4 Drawing Sheets

DIGITAL RECEIVER WITH MATCH FILTER RESPONSIVE TO FIELD SYNCHRONIZATION CODE IN THE FINAL I-F SIGNAL ENVELOPE

This is a continuation-in-part of application Ser. No. 08/746,294 filed Nov. 7, 1996.

The invention relates to detection of synchronizing signals in the digital data received by digital television receivers, for acquiring data field and line synchronization, and for acquiring symbol synchronization.

BACKGROUND OF THE INVENTION

Vestigial sideband (VSB) signals that are used in terrestrial through-the-air transmissions of digital high-definition television (HDTV) signals have their natural carrier wave, which would vary in amplitude depending on the percentage of modulation, replaced by a pilot carrier wave of fixed amplitude, which amplitude corresponds to a prescribed percentage of modulation. This percentage modulation has been standardized as being ⅝ times as large as the smallest change in symbol code level in symbol codes having eight levels. Such VSB signals have been chosen for over-the-air broadcasting within the United State and can be used in over-the-air narrowcasting systems or in cable-casting systems. However, certain cable-casting is likely to be done using suppressed-carrier quadrature amplitude modulation (QAM) signals instead, rather than VSB signals.

Radio receivers for receiving digital television signals, in which receiver the final intermediate-frequency signal is somewhere in the 1–8 MHz frequency range rather than at baseband, are described by C. B. Patel et alii in U.S. Pat. No. 5,479,449 issued Dec. 26, 1995, entitled DIGITAL VSB DETECTOR WITH BANDPASS PHASE TRACKER, AS FOR INCLUSION IN AN HDTV RECEIVER, and included herein by reference. The use of infinite-impulse response filters for developing complex digital carriers in such receivers is described by C. B. Patel et alii in U.S. Pat. No. 5,548,617 issued Aug. 20, 1996, entitled DIGITAL VSB DETECTOR WITH BANDPASS PHASE TRACKER USING RADER FILTERS, AS FOR USE IN AN HDTV RECEIVER, and incorporated herein by reference. The use of finite-impulse response filters for developing complex digital carriers in such receivers is described by C. B. Patel et alii in U.S. Pat. No. 5,731,848 issued Mar. 24, 1998, entitled DIGITAL VSB DETECTOR WITH BANDPASS PHASE TRACKER USING NG FILTERS, AS FOR USE IN AN HDTV RECEIVER, and incorporated herein by reference. The design of receivers for both VSB and QAM signals in which both types of signal are processed through the same intermediate-frequency amplifiers receivers is described by C. B. Patel et alii in U.S. Pat. No. 5,506,636 issued Apr. 9, 1996, entitled HDTV SIGNAL RECEIVER WITH IMAGINARY-SAMPLE-PRESENCE DETECTOR FOR QAM/VSB MODE SELECTION, and incorporated herein by reference. U.S. Pat. No. 5,606,579 issued Feb. 25, 1997 to C. B. Patel et alii and entitled DIGITAL VSB DETECTOR WITH FINAL I-F CARRIER AT SUBMULTIPLE OF SYMBOL RATE, AS FOR HDTV RECEIVER is incorporated herein by reference. The detection of data segment synchronization code groups in an HDTV receiver is described by J. Yang in U.S. Pat. No. 5,594,506 issued Jan. 14, 1977, entitled LINE SYNC DETECTOR FOR DIGITAL TELEVISION RECEIVER, and incorporated herein by reference. In U.S. Pat. No. 5,511,099 issued Apr. 23, 1996, entitled PASSBAND SYNC BLOCK RECOVERY, and incorporated herein by reference J. W. Ko et alii describe the use of match filters for detecting prescribed digital sequences having high autocorrelation properties that modulate a radio-frequency carrier in digital recording. These patents are all assigned to Samsung Electronics, Co., Ltd. pursuant to employee invention agreements already in force at the time the inventions disclosed in these patents were made.

In the radio receivers described in U.S. Pat. No. 5,506,636 the final IF signal is digitized and synchrodyne procedures to obtain baseband samples are carried out in the digital regime. In radio receivers that are to have the capability of receiving digital TV signals no matter whether they are transmitted using VSB or QAM, conversion of the signals to final IF signals just above baseband permits the frequencies of the local oscillators in the tuner to remain the same no matter whether VSB or QAM transmissions are being received. The differences in carrier frequency location within the channel are accommodated in the synchrodyning procedures carried out in the digital regime.

A problem that is encountered in the design of digital TV receivers is acquiring carrier synchronization, then symbol synchronization, and then data line and field synchronization rapidly enough that tuning across the band can be done without having to pause overlong at each channel to determine whether it carries programming and what the nature of the programming is. In prior digital TV receiver designs carrier synchronization and symbol synchronization are necessary before data line and field synchronization can be undertaken. The problem of carrier synchronization is considerably more difficult when receiving QAM transmissions, in which there is no accompanying pilot carrier, than it is when receiving VSB transmissions, in which there is an accompanying pilot carrier. In any case carrier synchronization takes some time to complete, and symbol synchronization carried out after synchronous detection takes additional time to complete. The time required for these procedures to be completed can make tuning from channel to channel sluggish. This is particularly so if an automatic successive-channel scan is being conducted by the HDTV receiver, looking for a desired program identification code.

In U.S. Pat. No. 5,511,099 J. W. Ko et alii describe the use of match filters for detecting prescribed digital sequences having high autocorrelation properties that modulate a radio-frequency carrier. The invention is described with particular regard to a digital VCR using a modulated radio-frequency carrier with upper-and lower-frequency sidebands (e.g., a 16-state QAM radio-frequency carrier), though U.S. Pat. No. 5,511,099 indicates the invention may also have application in other fields. The invention is described in terms of each sync block in the recorded information including a short prescribed digital sequence having high autocorrelation properties such as a Barker code or a pseudo-random (PR) sequence (also referred to as a "pseudo-random noise sequence" or "PN sequence") inserted as a sync signal into a predetermined time portion (in usual designs, the beginning) of the sync sub-block, or used repeatedly in selected polarities for coding at least a portion of the synchronizing information. The prescribed sequence for the sync information is constructed so as to have a zero-valued direct component, but also to have a high-valued autocorrelation property. A seven-bit Barker Code is indicated in U.S. Pat. No. 5,511,099 to be preferred, because it is shorter than most PR sequences that might be used. The development of the digital tape recording art for digital TV signals has strongly tended to favor the direct recording of NRZI digital codes on electromagnetic video tape using 24-to-25 modulation, rather than the use of modulated radio-frequency carriers for recording, however.

In the digital TV signals proposed for broadcasting, each data field contains 313 data segments or data lines, and the fields are consecutively numbered modulo-two in order of their occurrence. Each data segment or data line starts with a segment synchronization code group of four symbols having successive values of +S, –S, –S and +S. The value +S is one level below the maximum positive data excursion, and the value –S is one level above the maximum negative data excursion. Each data segment or data line is of 77.3 microseconds duration, and there are 832 symbols per data segment for a symbol rate of about 10 megabits/second. The initial segment of each data field is a field synchronization code group that codes a training signal for channel-equalization and multipath suppression procedures. The training signal is a 511-sample PR sequence followed by three 63-sample PR sequences. This training signal is transmitted in accordance with a first logic convention in the first segment of each odd-numbered data field and in accordance with a second logic convention in the first segment of each even-numbered data field, the first and second logic conventions being one's complementary respective to each other. The reference sequence(s) can be analyzed to determine the channel characteristic, and an appropriate equalizing filter can then be implemented.

The data segment synchronization code group or data line synchronization code group of four symbols having successive values of +S, –S. –S and +S used in digital TV broadcast signals does not have particularly high auto-correlation properties that peak in only one phasing. However, the PR sequences in the field synchronization code group included in the initial line of each data field are constructed so as to have high auto-correlation properties that peak in only one phasing. The PR sequences in the field synchronization code group have zero-valued direct component as well; or, if they do not, PR sequences from successive fields can be differentially combined to suppress accompanying direct component. Digital TV receivers can be constructed with complex-input-sample digital filters that are strongly selective for the PR sequences in the field synchronization code group. That is, these digital TV receivers are constructed with match filters responding to the final IF signal being modulated in accordance with the field synchronization code group.

The response of such a match filter permits rapid data field synchronization prior to carrier synchronization and symbol synchronization. Knowledge of when the data field begins permits prediction of when data segments begin and end so that data-segment or data-line synchronization can be keyed or gated, rather than continuous in nature, at the very outset of acquiring a channel. This avoids the likelihood of erroneous data segment lock to four-symbol groups in general digital TV data, which four-symbol groups happen to resemble a data-segment or data-line synchronization code group.

The response of a match filter for the field synchronization code group can facilitate carrier synchronization and symbol synchronization as well, if the final standards for HDTV broadcasting prescribe a fixed phasing of the PR sequences respective to the symbols used during data transmission. This is so even in the case of terrestrial through-the-air HDTV broadcasting, which uses vestigial sideband amplitude modulation. While the full sideband has much higher energy than the pilot carrier during the transmission of the PR sequences, the envelope of the transmitted signal will still exhibit amplitude variations that resemble the PR sequences. Accordingly, the amplitude variations in the envelope can still be detected and subjected to match filtering to determine when a field synchronization code group occurs, even though synchronous detection has not yet been accomplished in the radio receiver. This facilitates rapid determination of data synchronization and symbol synchronization by the radio receiver, since these procedures can begin to be carried forward before synchronous detection has been achieved. This facilitates rapidly tuning between HDTV channels.

When one attempts to understand why the pseudo-random sequences in the data field synchronization information give rise to variations in the envelope of the intermediate-frequency signal that reproduce those sequences when a relatively small pilot carrier is present, the inventors suggest that the suppressed-carrier amplitude modulation conveying those pseudo-random sequences, which modulation is essentially single-sideband in nature, be considered to be a phase-modulated carrier wave. Then, the inventors suggest that the relatively small pilot carrier be viewed as being single-sideband amplitude modulation of that phase-modulated carrier wave. When the relatively small pilot carrier and the relatively large phase-modulated carrier wave are of similar phase, the envelope of the combined signal will exhibit increased amplitude, the inventors note. When the relatively small pilot carrier and the relatively large phase-modulated carrier wave are of dissimilar phase, the envelope of the combined signal will exhibit decreased amplitude, the inventors further note. Accordingly, the inventors point out, the envelope of the intermediate-frequency signal, which is a bandpass transform of the baseband combined signal, will exhibit increased and decreased amplitude in accordance with the positive and negative excursions of the pseudo-random sequences in the data field synchronization information.

A 32-state QAM signal provides sufficient capacity for a single HDTV signal, without having to resort to compression techniques outside MPEG standards, but usually some compression techniques outside MPEG standards are employed to encode the single HDTV signal as a 16-state QAM signal. A prescribed 24-bit word is supplied as data-field indexing information. At the time this specification is written there is no training signal included in the QAM HDTV signal. Also, there is no data line synchronization signal for QAM HDTV transmission, at least not one selected as a standard. This specification presumes that field synchronization coding similar to that used in VSB HDTV is included in a 16-state QAM signal having a baud rate of $5.38*10^6$ symbols per second.

SUMMARY OF THE INVENTION

The invention is embodied in a radio receiver for receiving digital TV signals, which radio receiver has a match filter for receiving rectified samples of digitized intermediate-frequency signal and generating a pulse at the beginning of each data field responsive to the amplitude of the intermediate-frequency carrier being modulated in accordance with a field synchronization code group. Amplitude variations in the envelope of the intermediate-frequency carrier are detected and subjected to match filtering, to determine when a field synchronization code group occurs. This is done even if synchronous detection has not yet been accomplished in the radio receiver. Determination of data synchronization and symbol synchronization by the radio receiver is speeded, since these procedures can begin to be carried forward before synchronous detection has been achieved. This facilitates rapidly tuning between HDTV channels.

In the block schematic diagrams, clock or control signal connections are shown in dashed line, where it is desired to distinguish them from connections for the signals being controlled. To avoid overcomplexity in the block schematic diagrams, some shimming delays necessary in the digital circuitry are omitted, where a need for such shimming delay is normally taken into account by a circuit or system designer.

DETAILED DESCRIPTION

Figure 1:
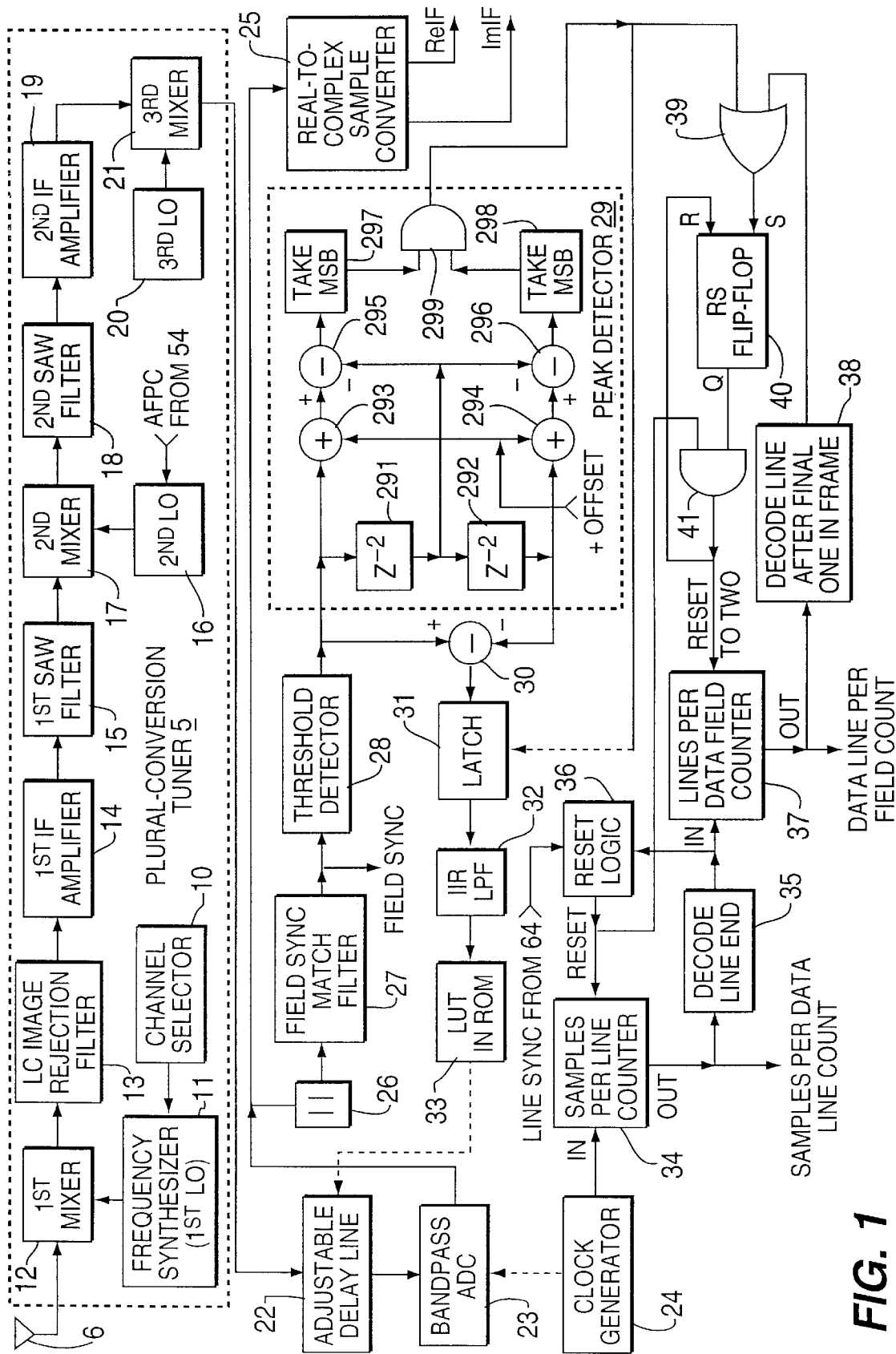
FIG. 1 is a block schematic diagram of initial portions of a digital TV receiver that embodies the invention in a preferred form, including the tuner and intermediate-frequency (IF) amplifier circuitry, an analog-to-digital converter for digitizing the final IF amplifier response, a match filter responding to the envelope of the final IF amplifier response being modulated in response to a field synchronization code group, a symbol synchronizer responding to match filter response for synchronizing symbols in the digitized final IF amplifier response, and data clocking circuitry.

FIG. 1 shows a tuner 5 comprising elements 11–21 that selects one of channels at different locations in the frequency band for digital TV signals and performs plural frequency conversion of the selected channel to a final intermediate-frequency signal in a final intermediate-frequency band. FIG. 1 shows a broadcast receiving antenna 6 arranged to capture the digital TV signals for the tuner 5. Alternatively, the tuner 5 can be connected for receiving digital TV signals from a narrowcast receiving antenna or from a cablecast transmission system.

More particularly, in the tuner 5 shown in FIG. 1, a channel selector 10 designed for operation by a human being determines the frequency of first local oscillations that a frequency synthesizer 11, which functions as a first-local oscillator, furnishes to a first mixer 12 for heterodyning with digital TV signals received from the antenna 6 or an alternative source of such signals. The first mixer 12 upconverts the received signals in the selected channel to prescribed first intermediate frequencies (e.g., with 920 MHz carrier), and an LC filter 13 is used to reject the unwanted image frequencies that accompany the upconversion result supplied from the first mixer 12. The first intermediate-frequency signal resulting from the upconversion, supplied as the filter 13 response, is applied as the input signal to a first intermediate-frequency amplifier 14, which supplies amplified first IF signal for driving a first surface-acoustic-wave (SAW) filter 15. The upconversion to the rather high first intermediate frequencies facilitates the SAW filter 15 having a large number of poles and zeroes. Second local oscillations from a second local oscillator 16 are supplied to a second mixer 17 for heterodyning with the response of the first SAW filter 15, to generate second intermediate frequencies (e.g., with 41 MHz carrier). A second SAW filter 18 is used for rejecting the unwanted image frequencies that accompany the downconversion result supplied from the second mixer 17. During the period of transition from NTSC television transmissions to digital television transmissions, the second SAW filter 18 will usually include traps for sound and video carriers of adjacent-channel NTSC television transmissions. The second IF signal supplied as the response of the second SAW filter 18 is applied as input signal to a second intermediate-frequency amplifier 19, which generates an amplified second IF signal response to its input signal. Oscillations from a third local oscillator 20 are heterodyned with the amplified second IF signal response in a third mixer 21.

This third IF signal response is the final intermediate-frequency output signal of the tuner 5, which is supplied to an analog delay circuit 22, the delay through which is adjustable in response to an electrical control signal. The delay circuit 22 typically comprises a tapped analog delay line receptive of the tuner 5 final IF output signal and an analog multiplexer responsive to a unary digital signal for selecting a delayed final IF output signal from one of the taps for application to a subsequent analog-to-digital converter (ADC) 22 for digitization. This final IF signal occupies a frequency band 6 MHz wide, the lowest frequency of which is above zero frequency. The lowpass analog filtering of the delayed final IF output signal response which is done in the ADC 23 as a preliminary step in analog-to-digital conversion suppresses the image frequencies of the third intermediate frequencies, and the second SAW filter 18 has already restricted the bandwidth of the delayed final IF output signal presented to the ADC 23 for digitization; so the ADC 23 functions as a bandpass analog-to-digital converter. The sampling of the lowpass analog filter response in the ADC 23 as the next step in analog-to-digital conversion is done responsive to pulses in a first clock signal supplied from a clock generator 24.

The clock generator 24 preferably includes a voltage-controlled oscillator (VCO) having its frequency stabilized by a crystal, but capable of frequency control over a relatively narrow range for generating cissoidal oscillations at a multiple of symbol rate. A symmetrical clipper or limiter generates a square-wave response to these cissoidal oscillations to generate the first clock signal, which the ADC 23 uses to time the sampling of the final IF signal, after filtering the final IF signal to limit its bandwidth. The generation of an automatic frequency and phase control (AFPC) signal for the clock generator 24 VCO will be described further on in this specification, with reference to FIG. 4 of the drawing. The pulses in the first clock signal recur at a rate of $21.52*10^6$ pulses per second, twice the baud rate for VSB signals of $10.76*10^6$ symbols per second and four times the baud rate for QAM signals of $5.38*10^6$ symbols per second. The ADC 23 supplies real digital responses of 10-bit or so resolution to the samples of the band-limited delayed final IF signal, which digital responses are converted to complex digital samples by conversion circuitry 25.

Various ways to construct the conversion circuitry 25 are known and are described in the above-referenced U.S. Pat. No. 5,506,636. IIR filters, as described in U.S. Pat. No. 5,548,617, can be used in the conversion circuitry 25. Alternatively, the conversion circuitry 25 can use FIR filters, as described by T. F. S. Ng in United Kingdom patent application 2 244 410 A published Nov. 27, 1991 and entitled QUADRATURE DEMODULATOR, or as described in the above-referenced U.S. Pat. No. 5,731,848. In still another alternative the conversion circuitry 25 can comprise a Hilbert transform filter for generating imaginary samples in response to the real samples, together with a delay for the real samples to compensate for the latency of the Hilbert transform filter. If the frequency band 6 MHz wide occupied by the final IF signal has a lowest frequency of at least a megaHertz or so, it is possible to keep the number of taps in a Hilbert transformation filter within the conversion circuitry 25 reasonably small and thus keep the latency time of the filter reasonably short. Placing the final IF signal so its mid-frequency is above 5.38 MHz reduces to less than four the number of samples occurring at $21.52*10^6$ samples per second rate in each cycle of QAM carrier, which undesirably reduces the uniformity of synchrodyne response supplied for symbol decoding.

A distinguishing feature of the digital TV receiver that appears in FIG. 1 is the symbol synchronizer, which is operative on the digitized IF amplifier response, rather than just on baseband response after synchronous detection of the QAM and VSB signals. This symbol synchronizer comprises an absolute value circuit 26 for rectifying each sample from the ADC 23 to provide envelope detection, a match filter 27 for responding to the envelope indicating that modulation of the carrier was by a field synchronization code group (one or more of the PR sequences in the first data line of each data field), a threshold detector 28 for suppressing smaller-value match filter 27 response, a peak detector 29 for responding to peaks or maxima in the match filter 27 response with an output pulse, a subtractor 30 used for comparing samples on either side of a peak or maximum for estimating whether symbol phase is too much advanced or too much retarded, a latch 31 for temporarily storing the difference from the subtractor 30, an infinite-impulse-response (IIR) digital lowpass filter (LPF) 32 for integrating the differences from the subtractor 30 to generate a read-only-memory (ROM) address, and a read-only memory (ROM) 33 storing a look-up table of control values. These control values generally take the form of digital numbers all places of which are ZEROs except for one place that is a ONE; the control signals differ in regard to the position of the place that is a ONE, each of which positions enables signal from a respective one of the taps in the tapped delay line in the adjustable delay circuit 22 to be supplied to the ADC 23. The LPF 32 selects which of these control values is to be applied to the electrically adjusted delay circuit 22 in order to effect symbol synchronization.

The peak detector 29 is shown in FIG. 1 as comprising a cascade connection of two-sample delay elements 291 and 292. The samples at the beginning and end of this cascade connection are augmented by an offset signal in digital adders 293 and 294, respectively; and the resulting augmented samples have the intervening central sample subtracted from them in digital subtractors 295 and 296, respectively. Only when the central sample is larger than both of the flanking augmented samples, the differences from both of the digital subtractors 295 and 296 will be negative. The sign bits of the differences from the digital subtractors 295 and 296 are selected by wired connections 297 and 298 to an AND 299, which responds with a logic ONE output only when the central sample is larger than both of the flanking augmented samples. The AND 299 detects those samples in the match filter 27 response that are closest to inflection points that are extreme peaks or maxima. The threshold detector 28 avoids the detection of inflection points that are local peaks or maxima as may occur in lower values of the match filter 27 response at edges of the PR sequences, etc.

When symbol synchronization is correct, the samples in the match filter 27 response that are closest to inflection points that are extreme peaks or maxima will be essentially coincident with those inflection points, and the samples immediately before and after will be substantially the same in amplitude. The difference output signal from the subtractor 30 will be zero-valued or nearly so. If symbol synchronization is too advanced in time, however, the earlier sample will exceed the later sample in amplitude. Accordingly, the difference output signal from the subtractor 30 will be substantially positive-valued, supposing the earlier and later samples are respectively applied to the subtractor 30 as minuend and subtrahend. If symbol synchronization is too retarded in time, the later sample will exceed the earlier sample in amplitude. Accordingly, the difference output signal from the subtractor 30 will be substantially negative-valued, supposing the earlier and later samples are respectively applied to the subtractor 30 as minuend and subtrahend. The detection of the central sample being an extreme peak or maximum conditions the AND gate response 299 to be a ONE, as noted above, which conditions the latch 31 to temporarily store the subtractor 30 difference between the amplitudes of the earlier and later samples. The IIR digital LPF 32 provides filtering against noise with a time constant of a few data fields.

Alternatively, the electrically controlled analog delay circuit 22 may be replaced by an electrically controlled analog delay circuit of a type responding to analog control signal. It is still desirable to use the IIR digital LPF 32 to obtain a long time constant stretching over a few data fields. But the IIR digital LPF 32 response is converted to analog form by an digital-to-analog converter for application to the electrically controlled analog delay circuit of a type responding to analog control signal. One skilled in electronic system design will understand that in order to effect symbol synchronization, rather than introducing adjustable delay into the final IF output signal supplied to the ADC 23, in alternative embodiments of the invention adjustable delay can instead be introduced into the clock signal supplied to the ADC 23. Introduction of adjustable delay into the final IF output signal is preferred, however, because there is much less problem in regard to phasing the clocking of the ADC 23 with respect to the clocking of subsequent digital circuitry.

In the digital TV receivers described in this specification, as in the digital TV receivers described by C. B. Patel et alii in U.S. Pat. No. 5,606,579, the final IF carrier frequency is chosen to be a submultiple of symbol frequency. However, in the. digital TV receivers described by C. B. Patel et alii the phase of the carrier used during synchronous detection is adjusted with respect to sampling clock in order to carry out symbol synchronization. In order to effect symbol synchronization in the present invention, however, the relative timing of the carrier of the IF signal and the sampling clock is instead adjusted prior to synchronous detection. This permits the phase of the carrier used during synchronous detection to be constant as timed with respect to the sampling clock. Indeed, the whole data structure that is to be detected is in fixed time relationship to the sampling clock even before its adjustment in respect to the carrier of the IF signal during symbol synchronization. This permits a portion of the count from a counter structure that counts clock samples per data line and data lines per data field to be used directly as addressing for read-only memories (ROMs) generating carriers for synchronous detection of the final IF signal from the third mixer 21. This counter structure is reset once per data field by the peak detector 29 response to the field sync match filter 27 response. The automatic frequency and phase control (AFPC) of a VCO within the clock generator 24 in response to data line pulses can be done quite rapidly, within less than a data field time constant; so as soon as symbol synchronization is completed, AFPC of the clock VCO and carrier synchronization are essentially completed. AFPC of the second local oscillator 16 (or the third local oscillator 20) which depends on synchronous detection of the final IF signal from the third mixer 21 can be done quite rapidly, within less than a data field time constant. So the settling of the digital TV receiver that embodies the invention is completed quite quickly, depending on the time constant for symbol synchronization. In more sophisticated digital TV receivers constructed in accordance with the invention, the time constant of the IIR digital LPF 32 can be adjustable, to provide for rapid settling after change of receiving channel and to provide slowed response thereafter so symbol synchronization is less affected by random events. Random events or noise does not affect symbol synchronization very much in any case since the elements 27, 28 and 29 are very selective in response.

The FIG. 1 counter structure that counts clock samples per data line and data lines per data field is more particularly described as follows. A counter 34 counts transitions in clock pulses supplied by the clock VCO 23 to generate a SAMPLES PER DATA LINE COUNT. A decoder 35 detects when the full count of clock samples per data line is reached to generate a logic ONE as output signal, rather than its customary logic ZERO. This logic ONE is supplied to reset logic circuitry 36 that assures that the SAMPLES PER DATA LINE COUNT will be reset to initial count responsive to the next transition of the clock pulse supplied by the clock VCO 23 to the counter 34. The occurrences of logic ONE pulses in the output signal of the decoder 35 are counted by a counter 37 to generate a DATA LINES PER DATA FIELD COUNT. A decoder 38 detects when the full count of data lines per data field plus one is reached, to generate a logic ONE as output signal, rather than its customary logic ZERO. The logic ONE from the decoder 38 and the data field sync pulse from the peak detector 29 are each a respective input signal to an OR gate 39, which responds to either of its input signals being high to supply a logic ONE to the set terminal of a reset-set (or RS) flip-flop 40. A logic ONE applied to the set terminal of the RS flip-flop 40 conditions its Q output terminal to be high. The Q output terminal of the RS flip-flop 40 connects to one input of a two-input AND gate 41, the other input of which is connected to receive the end-of-data-line decoder 35 output signal. The output connection of the AND gate 41 is to the reset connection of the counter 37; and the AND gate 41 resets the DATA LINES PER DATA FIELD COUNT from the counter 37 to an initial value of two at the end of the first data line of the data field. This arrangement of the data lines per data field counter 37 causes its data line count to be "incorrect" or other than one during the first line of each data field, and the digital TV receiver is constructed to take this into account.

There is an outside chance that the data within a data field might counterfeit the PR sequence(s) of the initial line of a data field. If this is of concern, the direct connection 42 from the peak detector 29 to the OR gate 39 can be replaced by circuitry that rejects pulse outputs from the peak detector 29 that occur when the decoder 38 output signal is low, unless those pulse outputs repeat during the same data line of successive data fields. In response to each pulse from the peak detector 29 the data line count from the counter 37 is temporarily stored in a shift register. Data line counts in the stages of the shift register are compared, and finding a correspondence of data line counts enables pulse outputs from the peak detector 29 to be applied the OR gate 39 (through an AND gate, for example).

Figure 2:
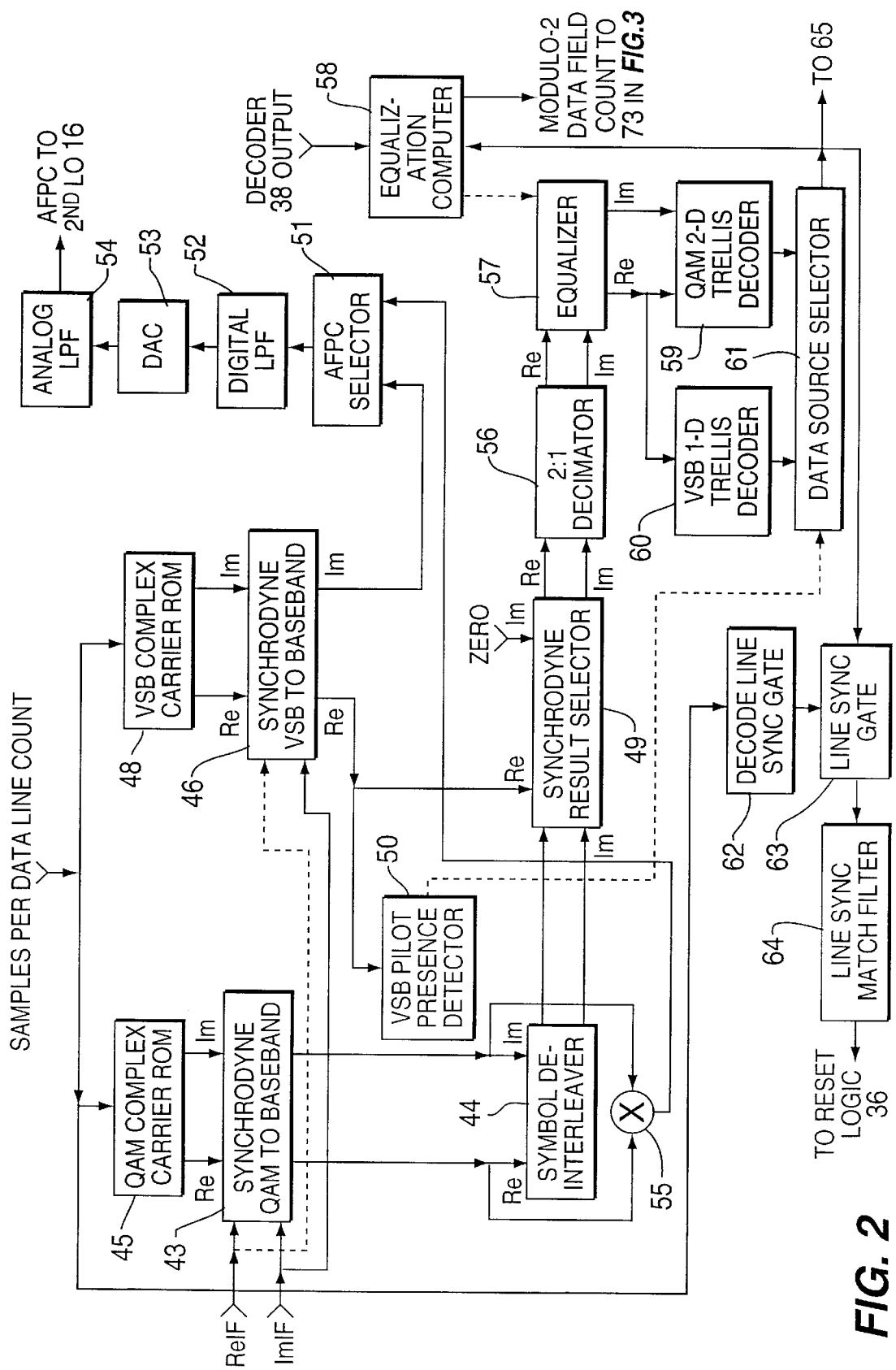
FIG. 2 is a block schematic diagram of further portions of the digital TV receiver that embodies the invention in a preferred form, including circuitry for synchronously detecting digitized final IF amplifier response of QAM type to obtain baseband symbols, circuitry for synchronously detecting digitized final IF amplifier response of VSB type to obtain baseband symbols, an amplitude equalizer for symbols selected from the circuitry for synchronously detecting symbols, trellis decoders for QAM and VSB, and data segment synchronization circuitry.

In the FIG. 2 receiver circuitry the complex digital samples of final IF signal supplied from the real-to-complex-sample conversion circuitry 25 in FIG. 1 are applied to circuitry 43 for synchrodyning the QAM signal to baseband to supply in parallel to a symbol de-interleaver 44 a stream of real samples and a stream of imaginary samples descriptive of the complex-amplitude-modulation modulating signal. The QAM synchrodyning circuitry 43 receives complex-number digital descriptions of two phasings of the QAM carrier, as translated to final intermediate frequency and in quadrature relationship with each other, from read-only memory 45. ROM 45, which comprises sine and cosine look-up tables for QAM carrier frequency, is addressed by the SAMPLES PER DATA LINE COUNT from the counter 34 and, where necessary, the DATA LINES PER DATA FIELD COUNT from the counter 37, and a DATA FIELD COUNT supplied from a microcomputer 58 the functions of which will be described in more detail further on in this specification.

In the FIG. 2 receiver circuitry the complex digital samples of final IF signal supplied from the real-to-complex-sample conversion circuitry 25 in FIG. 1 are also applied to circuitry 46 for synchrodyning the VSB signal to baseband to generate a stream of real samples descriptive of the vestigial-sideband modulating signal. The VSB synchrodyning circuitry 46 receives complex-number digital descriptions of two phasings of the VSB carrier, as translated to final intermediate frequency and in quadrature relationship with each other, from read-only memory 48. ROM 48, which comprises sine and cosine look-up tables for VSB carrier frequency, is addressed by the SAMPLES PER DATA LINE COUNT from the counter 34, the DATA LINES PER DATA FIELD COUNT from the counter 37, and a DATA FIELD COUNT from the microcomputer 58.

A digital-signal multiplexer 49 functions as a synchrodyne result selector that selects as its response either a first or a second one of two complex digital input signals thereto, the selection being controlled by a detector 50 for detecting the zero-frequency term of the real samples from the VSB synchrodyne circuitry 46. When the zero-frequency term has essentially zero energy, indicating the absence of pilot carrier signal that accompanies a VSB signal, the multiplexer 49 selectively responds to its first complex digital input signal, which is the de-interleaved QAM synchrodyne-to-baseband result supplied from the symbol de-interleaver 44. When the zero-frequency term has substantial energy, indicating the presence of pilot carrier signal that accompanies a VSB signal, the multiplexer 49 selectively responds to its second complex digital input signal, the real terms of which are supplied from the VSB synchrodyning circuitry 46 and the imaginary terms of which are all wired arithmetic zero.

The number of symbols per data line and the number of data lines per data field may differ, depending on whether VSB or QAM digital television transmissions are being received. If such differences obtain in the two standards, the indications of the absence or presence of pilot signal supplied by the detector 50 are supplied to the decoders 35 and 38 in FIG. 1 by connections which are not shown in FIGS. 1 and 2. Responsive to these indications, the decoder 35 can change the sample count decoded as the end of the data line, and the decoder 38 can change the data line count decoded as next after the end of the data field.

In order that ROMs 45 and 48 can be used to generate digital complex-number descriptions of the QAM and VSB signal carriers as translated to respective final intermediate frequencies, in response to addressing generated by counting first clock signals, provision must be made to lock the one those final intermediate frequencies that is the carrier of the currently received digital TV signal to a submultiple of a multiple of the first clock signal frequency. That is, those final intermediate frequencies must be in whole number ratios with the first clock signal frequency. An automatic phase and frequency control (AFPC) signal is developed from the output of the one of the synchrodyne circuits 43 and 46 that detects the currently received digital TV signal; and this AFPC signal is used to control the frequency and phase of one of the local oscillators 11, 16 and 20 in the tuner. Using a fixed-frequency third local oscillator 20, and controlling the frequency and phase of the oscillations the second local oscillator 16 provides, is preferred in that alignment of the second IF signal with the second SAW filter 18 can be readily assured. The second SAW filter 18 usually contains traps for adjacent-channel signal components, in which case proper alignment of the second IF signal between these traps is important for preserving its integrity. The symbol clocking is made to exhibit a high degree of frequency stability. By locking the carrier of the final intermediate-frequency (IF) signal in frequency and phase to a submultiple of a multiple of the symbol clock frequency, the AFPC for correcting frequency and phase error in the carrier as translated to a final intermediate frequency invariably operates to correct dynamic symbol phase error as well, eliminating the need for a separate phase tracker to correct dynamic symbol phase error.

FIG. 2 denominates a digital multiplexer 51 as "AFPC selector". The multiplexer 51 responds to the pilot carrier presence detector 50 indicating that a pilot carrier is included in the currently received digital TV signal for selecting, as an input signal for a digital lowpass filter 52, the imaginary output signal of the baseband response of the VSB synchrodyne circuitry 46. The response of lowpass filter 52 is a digital AFPC signal supplied as input signal to a digital-to-analog converter (DAC) 53. The output signal from the DAC 53 is an analog AFPC signal, which is subjected to further lowpass filtering in an analog lowpass filter 54, the response of which filter 54 is used for controlling the frequency and phase of the oscillations that the second local oscillator 16 provides. Analog lowpass filtering is advantageous to use for realizing long-time-constant lowpass filtering because there is reduced need for active devices as compared to digital lowpass filtering. Since the shunt capacitor of a resistance-capacitance lowpass filter section can be at the interface between a tuner 5 IC and the IC containing the digital synchrodyning circuitry, the analog lowpass filtering can be done without any cost in IC pin-out. Doing some digital lowpass filtering is advantageous, however, since the digital lowpass filter response can be subsampled to the DAC 53; the reduced speed requirements on the digital-to-analog conversion reduces the cost of the DAC 53.

The multiplexer 51 responds to the pilot carrier presence detector 50 indicating that a pilot carrier is not included in the currently received digital TV signal for selecting the input signal for the digital lowpass filter 52 from the circuitry for processing a QAM digital TV signal. FIG. 2 shows the product output signal of a digital multiplier 55 being provided for such selection. The digital multiplier 55 multiplies together the real and imaginary output signals of the QAM synchrodyne circuitry 43 to generate an unfiltered digital AFPC signal. The generation of the unfiltered digital AFPC signal is very similar to that in the well-known Costas loop. In the Costas loop the AFPC signal is used to control the frequency and phase of the digital local oscillations used for synchrodyning received signals to baseband. The FIG. 2 arrangement departs from this procedure, the AFPC signal being used instead to control the frequency and phase of the analog oscillations generated by the second local oscillator 16. This regulates the frequency and phase of the final IF signal supplied to the ADC 23 for digitization and for subsequent synchrodyning to baseband in the digital regime. As is the case with the Costas loop, the multiplier 55 is preferably of especial design in which the real signal is converted to a ternary signal for multiplying the imaginary signal; this simplifies the digital multiplier and improves the pull-in characteristics of the AFPC loop.

The carrier of the QAM digital TV signal and the carrier of the VSB digital TV signal are translated to respective intermediate frequencies, each of which is a submultiple of a multiple of the 21.52 MHz sample rate that is the fourth harmonic of the 5.38 MHz symbol frequency of the QAM digital TV signal and that is the second harmonic of the 10.76 MHz symbol frequency of the VSB digital TV signal. These two respective intermediate frequencies are at a 2.690 MHz remove from each other, since the carrier of the QAM digital TV signal is at the center of a 6-MHz-wide TV channel, but the carrier of the VSB digital TV signal is only 310 kHz above the lowest frequency of a 6-MHz-wide TV channel. U.S. Pat. No. 5,506,636 describes the frequencies of the local oscillators 11, 16 and 20 in the tuner 5 being chosen so that the final intermediate frequency to which the carrier of a VSB digital TV signal is translated is lower than that to which the carrier of a QAM digital TV signal is translated. This facilitates symbol synchronization when a VSB digital TV signal is received being of a type similar to that described by S. U. H. Qureshi for use with pulse amplitude modulation (PAM) signals in his paper "Timing Recovery for Equalized Partial-Response Systems, IEEE Transactions on Communications, December 1976, pp. 1326–1330.

Preferably the intermediate frequency to which the carrier of a QAM digital TV signal is translated is not more than 5.38 MHz, so that it can be sampled at least four times per cycle in accordance with the 21.52 MHz sample clock, which preference constrains the lowest frequency in the final IF signal to being no higher than 2.38 MHz. Preferably the lowest frequency of the final IF signal is above 1 MHz, to keep the ratio of the highest frequency of the final IF signal thereto substantially below 8:1 and thereby ease the filtering requirements for the real-to-complex-sample converter 25, so the intermediate frequency to which the carrier of a VSB digital TV signal is translated is preferably above 1.310 MHz.

The eighth and the sixteenth subharmonics of 43.04 MHz exhibit exactly the desired offset 2.69 MHz offset between them, and each has an integral number of cycles in one data line of 3328 samples (832 symbols), so as to permit direct addressing of the ROMs 45 and 48 by the SAMPLES PER DATA LINE COUNT from the counter 34. Other sets of subharmonics are disfavored because of their relatively high error in regard to the desired 2.69 MHz offset and not having an integral number of cycles in one data line of 3328 samples. If the frequency of the QAM carrier is to be higher than that of the VSB carrier, the VSB carrier is made the sixteenth subharmonic of 43.04 MHz, 2.690 MHz; and the QAM carrier is made the eighth subharmonic of 43.04 MHz, 5.380 MHz.

Where the PR sequences in the field synchronization code group included in the initial line of each data field are accurately phased with regard to symbol intervals, so symbol synchronization can be carried out by synchronizing the sampling clock to the PR sequences, there is no longer need to meet the requirements for achieving symbol synchronization by methods similar to those described by Qureshi. Accordingly, there is less reason not to choose the frequencies of the local oscillators 11, 16 and 20 in the tuner 5 so that the final intermediate frequency to which the carrier of a VSB digital TV signal is translated is higher than that to which the carrier of a QAM digital TV signal is translated. That is, there is less reason not to locate the pilot carrier 310 kHz from the upper-frequency edge of the final-IF band rather than 310 kHz from its lower-frequency edge. Since the data has lower frequency content suppressed in it, the data modulation tends to have most of its energy remote from the carrier. Placing the full modulation sideband of the VSB signal at lower frequency means that inaccurate timing of samples (owing to time base instability in the sampling clock) causes less error in the synchrodyne to base band, owing to sampling off the maxima of the signal. If the frequency of the QAM carrier remains at 5.380 MHz, the eighth subharmonic of 43.04 MHz, the VSB carrier is placed at 8.07 MHz, by way of example.

The correction of nominal second local oscillator 16 frequency required to lock each of the QAM and VSB carriers in the final IF signals to their desired submultiple frequencies is a very small percentage of the 960 MHz frequency of its oscillations, so the stability of its oscillations are little affected by its being AFPC'd. The shift of the second intermediate frequencies insofar as they fall into the traps of the second SAW filter 18 is the more significant consideration. The effects of this shift can be countered by changing the frequency of the third local oscillator 20 a few kHz by shunting its crystal tank circuit with switched capacitance during one reception mode. In past commercial designs for NTSC TV receivers, mistuning up to 30 kHz has been tolerated in IF amplifiers constructed with discrete stages having inductors and capacitors as frequency-selective elements, and somewhat greater mistuning has been tolerated in monolithic IF amplifiers using SAW filters.

The response of the synchrodyne result selection multiplexer 49 is resampled in 2:1 decimation circuitry 56 (which, by way of example, performs the re-sampling in response to the least significant bit from the samples-per-data-line counter 34) to reduce the sample rate of complex baseband response down to the 10.76 MHz VSB symbol rate, which is twice the 5.38 MHz QAM symbol rate. The 2:1 decimation of the multiplexer 49 response prior to its application as input signal to an equalizer 57 reduces the hardware required for the equalizer. Alternatively, rather than 2:1 decimation circuitry 57 being used after the synchrodyne result selection multiplexer 49, the baseband responses of the QAM synchrodyne circuitry 43 and of the VSB synchrodyne circuitry 46 can each be resampled to carry out 2:1 decimation before the synchrodyne result selection multiplexer 49.

The equalizer 57 is a multiple-tap digital filter with adjustable weighting coefficients and is served by the microcomputer 58 for calculating updated tap weights. The equalizer 57 converts a baseband response with an amplitude-versus-frequency characteristic that tends to cause inter-symbol error to a more optimum amplitude-versus-frequency characteristic that minimizes the likelihood of inter-symbol error. The microcomputer 58 calculates tap weights from the PR sequences in the initial line of each data field as selected thereinto in response to the decoder 38 output signal being ONE. The microcomputer 58 accumulates PR sequences from several data fields to generate a training signal which is then compared with an ideal training signal as known a priori for calculating updated tap weights for the multiple-tap digital filter used in the equalizer 57 for amplitude equalization. The microcomputer 58 also counts data fields, to generate a DATA FIELD COUNT supplied to the ROMs 45 and 48 for generating complex carriers for synchrodyning the QAM and VSB IF signals, and to generate a modulo-2 field count supplied to an MPEG-2 video decoder 73 shown in FIG. 3.

The response of the equalizer 57 is applied as input signal to a two-dimensional trellis decoder 59, which performs the symbol decoding that recovers a digital data stream from a QAM-origin signal. The response of the amplitude equalizer 57 is also applied as input signal to a one-dimensional trellis decoder 60, which performs the symbol decoding that recovers a digital data stream from a VSB-origin signal. A digital-signal multiplexer 61 functions as a data source selector that selects as its response either a first or a second one of two digital input signals thereto, the selection being controlled by the detector 50 for detecting the zero-frequency term of the real samples from the VSB synchrodyne circuitry 46. When the zero-frequency term has essentially zero energy, indicating the absence of pilot carrier signal that accompanies a VSB signal, the multiplexer 61 selectively responds to its first digital input signal, selecting as the source of its digital data output the two-dimensional trellis decoder 59 that decodes the symbols received in the QAM signal. When the zero-frequency term has substantial energy, indicating the presence of pilot carrier signal that accompanies a VSB signal, the multiplexer 61 selectively responds to its second digital input signal, selecting as the source of its digital data output the one-dimensional trellis decoder 60 that decodes the symbols received in the VSB signal.

When enabled by a decoder 62 decoding SAMPLES PER DATA LINE COUNTs from the counter 34 that define an interval during which a line sync code group is predicted to occur, a line sync gate 63 selects line sync code groups from the data selected by the multiplexer 61 to the input connection of a line sync match filter 64. The line sync match filter 64 generates a pulse responsive to the occurrence of the line sync code group. This pulse is applied to the reset logic circuitry 36 for the samples-per-data-line counter 34 shown in FIG. 1.

Figure 3:
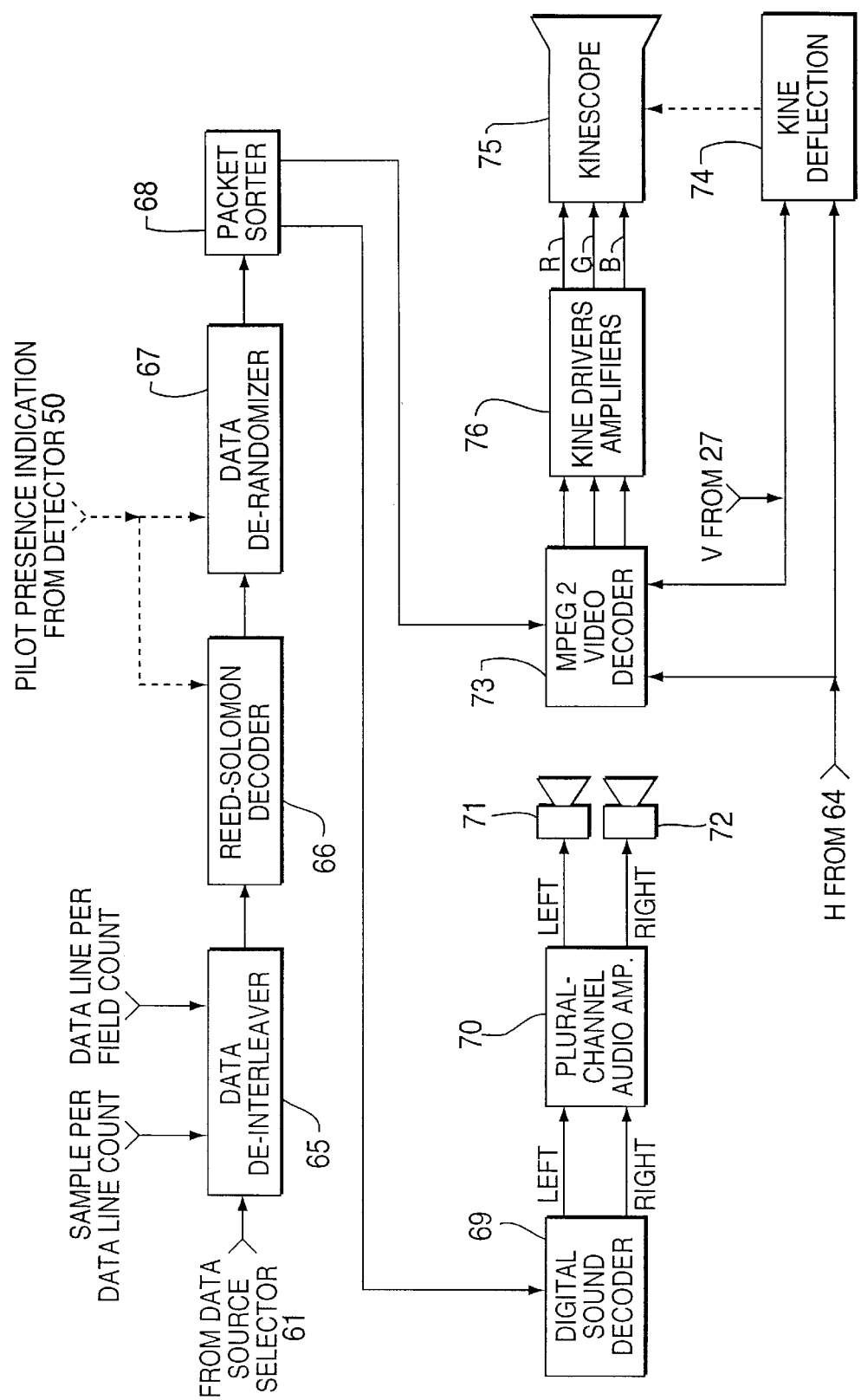
FIG. 3 is a block schematic diagram of remaining portions of the digital TV receiver that embodies the invention in a preferred form, not shown in FIGS. 1 and 2, which remaining portions include a data de-interleaver, a Reed-Solomon decoder, a data de-randomizer, a packet sorter, an MPEG-2 video decoder, a digital sound decoder, and the video and audio circuitry of the digital TV receiver.

FIG. 3 shows a data de-interleaver 65 receiving as its input signal the data selected by the FIG. 2 data source selection multiplexer 61. FIG. 3 shows a Reed-Solomon decoder 66 for correcting errors in the de-interleaved data supplied from the data de-interleaver 65. The data de-interleaver 65 is often constructed within its own monolithic IC and is made so as to respond to the output indications from the pilot carrier presence detector 50 to select the de-interleaving algorithm suitable to the digital TV signal currently being received, whether it be of QAM or VSB type; this is a mere matter of design. The Reed-Solomon decoder 66 is often constructed within its own monolithic IC and is made so as to respond to the output indications from the pilot carrier presence detector 50 to select the appropriate Reed-Solomon decoding algorithm for the digital TV signal currently being received, whether it be of QAM or VSB type; this also is a mere matter of design. Error-corrected data are supplied from the Reed-Solomon decoder 66 to a data de-randomizer 67, which regenerates packets of data for a packet sorter 68. The data de-randomizer 67 is made so as to respond to the output indications from the pilot carrier presence detector 50 to select the appropriate data de-randomizing algorithm for the digital TV signal currently being received, whether it be of QAM or VSB type; this is a mere matter of design, too.

The packet sorter 68 sorts packets of data for different applications, responsive to header codes in the successive packets of data. Packets of data descriptive of the audio portions of the digital TV program are applied by the packet sorter 68 to a digital sound decoder 69. The digital sound decoder 69 supplies left-channel and right-channel stereophonic sound signals to a plural-channel audio amplifier 70 that drives the plurality of loudspeakers 71, 72. Packets of data descriptive of the video portions of the digital TV program are applied by the packet sorter 68 to the MPEG-2 video decoder 73. Kinescope deflection circuitry 74 that provides for the raster scanning of the viewing screen of a kinescope 75 receives horizontal (H) and vertical (V) synchronizing signals from the line sync match filter 63 in FIG. 2 and from the field sync match filter 27 in FIG. 1, respectively. The MPEG-2 decoder 73 also receives these horizontal (H) and vertical (V) synchronizing signals, which are used by the MPEG-2 decoder 73 to synchronize its supplying input signals to the kinescope driver amplifiers 76 for applying amplified red (R), green (G) and blue (B) drive signals to the kinescope 75. In variations of the digital TV receiver shown in FIGS. 1 and 2, a different display device may be used instead of or in addition to the kinescope 75, and the sound recovery system may be different, consisting of only a single audio channel, or being more elaborate than a simple stereophonic reproduction system.

Figure 4:
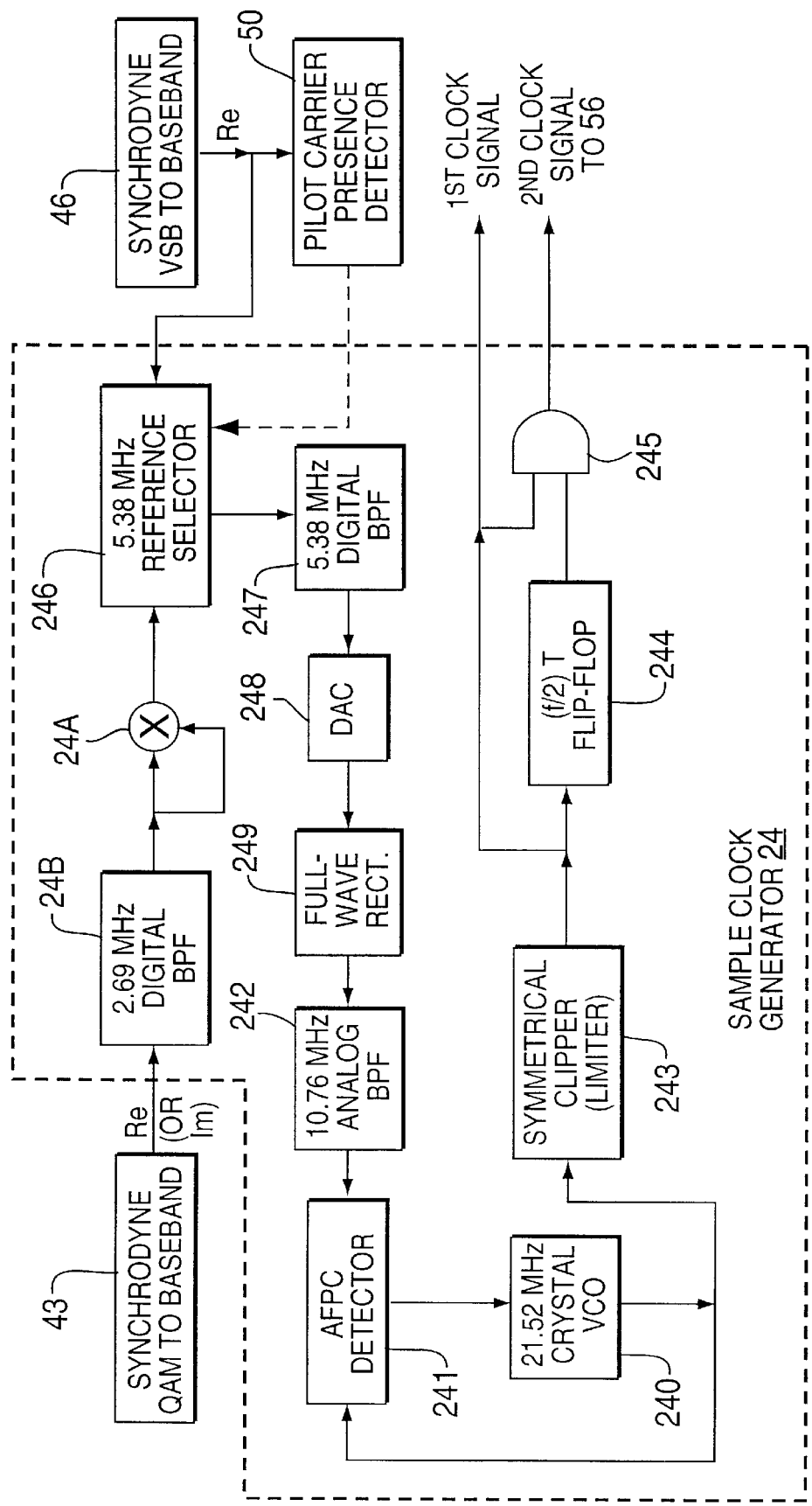
FIG. 4 is a block schematic diagram showing details of a clock generator shown in FIG. 2.

FIG. 4 shows in detail a representative construction of the sample clock generator 24. This construction includes a voltage-controlled oscillator 240 that generates cissoidal oscillations nominally of 21.52 MHz frequency. The oscillator 240 is a controlled oscillator, the frequency and phase of its oscillations being controlled by an automatic frequency and phase control (AFPC) signal voltage. This AFPC signal voltage is generated by an automatic frequency and phase control (AFPC) detector 241, which compares frequency-divided response to the oscillations of the oscillator 240 with a 10.76 MHz reference carrier supplied via an analog 10.76 MHz bandpass filter 242. Preferably, oscillator 240 is of a type using a crystal for stabilizing the natural frequency and phase of its oscillations. A symmetrical clipper or limiter 243 generates an essentially squarewave response to these cissoidal oscillations, which is used as the first clock signal for timing the sampling of the final IF signal in the ADC 23. A frequency-divider flip-flop 244 responds to transitions of the first clock signal in a prescribed sense for generating another square wave with a fundamental frequency of 10.76 MHz, half the frequency of the oscillations of the oscillator 240. This frequency-divided response to the oscillations of the oscillator 240 is supplied to the AFPC detector 241 for comparison with the 10.76 MHz reference carrier supplied via the 10.76 MHz bandpass filter 242. The frequency-divider flip-flop 244 also supplies squarewave output signal with a fundamental frequency of 10.76 MHz to an AND circuit 245 to be ANDed with the first clock signal for generating a second clock signal used by the 2:1 decimator 56 shown in FIG. 2.

The AFPC signal voltage for controlling the VCO 240 is generated by dividing the frequency of the 21.52 MHz reference carrier supplied from the VCO 240 to obtain a subharmonic thereof for comparison with a signal generated by frequency multiplier circuitry. A component of the received DTV signal as synchrodyned to baseband, which component is of a frequency that is a subharmonic of the symbol frequency (or baud frequency), is extracted by frequency-selective filtering. The frequency multiplier circuitry multiplies the frequency of that subharmonic of the symbol frequency by an appropriate factor to generate the signal for comparison with the subharmonic of the 21.52 MHz reference carrier. The details of this procedure will now be specifically described, first presuming the received DTV signal is a VSB signal with a baud rate of $10.76*10^6$ symbols per second, and then presuming the received DTV signal is a QAM signal with a baud rate of $5.38*10^6$ symbols per second.

A digital multiplexer 246 responds to the pilot carrier presence detector 50 detecting pilot carrier accompanying the received DTV signal, which is indicative that the received DTV signal is a VSB signal, to select the real samples of this VSB signal supplied from the synchrodyne circuitry 46 for application to a bandpass FIR digital filter 247 that provides a selective response centered at 5.38 MHz, which selects the first subharmonic of symbol frequency from the VSB signal. Further frequency multiplication of the 5.38 MHz is performed in the analog regime to avoid undersampling problems that arise when attempting to perform further frequency multiplication in the digital regime. An digital-to-analog converter (DAC) 248 converts the filter 247 response to analog form for application to full-wave rectification circuitry 249, which generates harmonics of the filter 247 response including a strong 10.76 MHz component as second harmonic of 5.38 MHz. The analog bandpass filter 242 responds to this 10.76 MHz second harmonic to supply the AFPC detector 241 with 10.76 MHz reference carrier input signal.

The digital multiplexer 246 responds to the pilot carrier presence detector 34 not detecting pilot carrier accompanying the received DTV signal, which is indicative that the received DTV signal is a QAM signal, to select the output signal of a squaring circuit 24A for application to the bandpass filter 247 that provides a selective response centered at 5.38 MHz. A bandpass FIR digital filter 24B that provides a selective response centered at 2.69 MHz for selecting the 2.69 MHz first subharmonic of the symbol frequency of a baseband QAM signal supplies input signal to the squaring circuit 24A, which generates harmonics of the filter 24B response including a strong 5.38 MHz component. This baseband QAM signal comprises either the real stream of samples or the imaginary stream of samples supplied from the synchrodyne circuitry 43.

The squaring circuit 24A is shown in FIG. 4 as a digital multiplier receiving the filter 24B response both as multiplier and multiplicand. The squaring circuit 24A can be constructed from logic gates as a digital multiplier, but for the sake of speedier operation is better provided by a ROM storing a look-up table of squares. An absolute-value circuit can be used as a substitute for the squaring circuit in generating harmonics of the response of a preceding filter, but produces weaker second harmonics and so is not preferred.

Embodiments of the invention are contemplated which do not use the pilot carrier presence detector 50 to determine whether the digital TV signal being currently received is of QAM or VSB type. For example, the imaginary samples from the quadrature-phase synchronous detector in the VSB synchrodyne circuitry are squared, the squared samples are lowpass filtered, and the lowpass filter response is threshold detected. If the digital TV signal being currently received is of VSB type, the imaginary samples from the quadrature-phase synchronous detector in the VSB synchrodyne circuitry are substantially zero-valued, the squared samples are substantially zero-valued, and the lowpass filter response is substantially zero-valued, so it does not exceed the threshold level of the threshold detector. If the digital TV signal being currently received is of QAM type, the imaginary samples from the quadrature-phase synchronous detector in the VSB synchrodyne circuitry have at least at times values other than zero, and the lowpass filter response to the squared imaginary samples contains a direct term that exceeds the threshold level of the threshold detector. The pilot carrier presence detector 50 is preferred of its also being useful in the AGC circuitry for controlling the conversion gain of the tuner 5.

Less preferred embodiments of the invention are contemplated in which the output signals of the two-dimensional trellis decoder 59 and of the one-dimensional trellis decoder 60 are supplied to respective data de-interleavers, with data source selection being deferred until data de-interleaving is completed. Other less preferred embodiments of the invention are contemplated in which embodiments the output signal of the two-dimensional trellis decoder 59 is de-interleaved by a respective data de-interleaver and then decoded by a respective Reed-Solomon decoder to generate a first stream of error-corrected data, in which embodiments the output signal of the one-dimensional trellis decoder 60 is de-interleaved by a respective data de-interleaver and then decoded by a respective Reed-Solomon decoder to generate a second stream of error-corrected data, and in which embodiments data source selection is made between the first and second streams of error-corrected data. In modifications of these other less preferred embodiments of the invention the first and second streams of error-corrected data are supplied to separate data de-randomizers before data source selection is made. In other variants separate Reed-Solomon decoders are used for the QAM and VSB signals, but one data de-interleaver is used for both the QAM and VSB signals, or one data de-randomizer is used for both the first and second streams of error-corrected data.

In the preferred embodiment of the invention the analog intermediate-frequency carrier modulated in accordance with said digital TV signal is digitized prior to synchronous detection using circuitry 46 for synchrodyning to baseband the digitized modulated carrier as delayed by the adjustable delay line 22. In the preferred embodiment of the invention the envelope detection of the modulated intermediate-frequency carrier is performed in the digital regime using an absolute-value circuit 26 as the envelope detector, the digital output signal of which is suited for direct application to a field sync match filter 27. The invention can alternatively be embodied in digital radio receivers in which synchronous detection is performed in the analog regime and the analog baseband result of such synchronous detection is then digitized by an analog-to-digital converter of lowpass type and of several-bit resolution. The envelope detection of the analog modulated intermediate-frequency carrier can be carried out in the analog regime as well, with the response of the analog envelope detector, which typically comprises a rectifier followed by an imperfect integrator, being supplied to an analog-to-digital converter of lowpass type and of one-bit or few-bit resolution to generate input signal for the field sync match filter. This avoids the need for a second analog-to-digital converter of lowpass type and of several-bit resolution that would be used if the envelope detection were carried out in the digital regime instead. The analog modulated intermediate-frequency carrier can be cored before envelope detection to facilitate analog-to-digital conversion with reduced bit resolution.

Modifications can be made to the FIG. 1 circuitry to replace the adjustable delay line 22 with a direct connection or with fixed delay, and symbol synchronization can be effected by adjusting the phase of the clock applied to the analog-to-digital converter 23 instead of by adjusting the delay of the analog last intermediate frequency signal supplied to the ADC 23. The adjustment of the clock phase should be such as to allow continuous adjustment of clock phase without discontinuity of control between two increments of phase. The desired type of phase adjustment can be made by using a ring counter clock oscillator with appropriate logic circuitry for selecting one phase of the counter clock oscillator output signal.

One skilled in the art of digital system design will by acquaintance with the foregoing portion of this specification be able to generate various designs for the match filter 27. The match filter 27 can respond to a selected number of the samples in the initial line of each data field, but to better discriminate against data during other lines of a data field the number of samples should be reasonably large, spanning sixty symbol periods or more. The match filter 27 can be one that generates a respective pulsed match filter response each time a prescribed 63-sample pseudo-random sequence occurs, but a great number of other match filter 27 designs are feasible. The match filter 27 can be one that generates a respective pulsed match filter response each time a prescribed set of plural 63-sample pseudo-random sequence occurs. The match filter 27 can be one that generates a respective pulsed matched filter response only when the three 63-sample pseudo-random sequences in the initial line of odd-numbered data field occur, or the match filter 27 can be one that generates a respective pulsed match filter response only when the three 63-sample pseudo-random sequences in the initial line of an even-numbered data field occur. The match filter 27 can be one that responds to the initial and final 63-sample pseudo-random sequences in the initial data line of each a data field. The match filter 27 can be one that generates a respective pulsed match filter response each time a prescribed portion of a prescribed set of plural 63-sample pseudo-random sequences occurs. The match filter 27 can be one that generates a respective pulsed match filter response each time a prescribed 511-sample pseudo-random sequence occurs. The match filter 27 can be one that generates a respective pulsed match filter response each time a prescribed portion of a prescribed 511-sample pseudo-random sequence occurs. The match filter 27 can be one that generates a respective pulsed match filter response each time a prescribed a prescribed 63-sample pseudo-random sequence and a prescribed 511-sample pseudo-random sequence occur sequentially in prescribed order. The match filter 27 can be one that generates a respective pulsed match filter response each time there occurs a prescribed portion of a prescribed sequence comprising a prescribed 63-sample pseudo-random sequence and a prescribed 511-sample pseudo-random pseudo-random sequence in prescribed sequential order. The match filter 27 can be one that generates a respective pulsed match filter response each time there occurs a prescribed portion of a prescribed sequence comprising a prescribed set of plural 63-sample pseudo-random sequence and a prescribed 511sample pseudo-random sequence in prescribed sequential order.

In the claims which follows, the word "said" is used whenever reference is made to an antecedent, and the word "the " is used for grammatical purposes other than to refer back to an antecedent.

What is claimed is:

1. A radio receiver for receiving amplitude modulation of a suppressed carrier descriptive of a digital TV signal, said digital TV signal having a plurality of successive data fields each including a respective data field synchronization code at the beginning thereof, said digital TV signal including symbol codes of various amplitudes in the rest of each of said successive data fields, said amplitude modulation accompanied by a pilot carrier of the same frequency as said suppressed carrier and of an amplitude relatively small compared to said amplitude modulation during the transmission of said data field synchronization code, said radio receiver comprising:

a tuner supplying an amplitude modulation of an analog intermediate-frequency suppressed carrier amplitude modulated in accordance with said digital TV signal, said amplitude modulation having an envelope exhibiting amplitude variations in response to said symbol codes, and owing to the accompanying pilot carrier said amplitude modulation having an envelope exhibiting amplitude variations in response to said data field synchronization codes;

a demodulator demodulating said amplitude modulation of said amplitude modulated analog intermediate-frequency suppressed carrier to supply a baseband response including reproduced data field synchronization codes in response to said amplitude variations in response to said data field synchronization codes; and a field match filter receiving as its input signal said baseband response and generating a respective pulsed match filter response each time a prescribed portion of said reproduced data field synchronization codes occurs.

2. The radio receiver of claim 1, said demodulator being an envelope detector.

3. The radio receiver of claim 1, said pulsed match filter responses being used for symbol synchronization.

4. The radio receiver of claim 1, said pulsed match filter responses being used for identifying the initial lines of said successive data fields.

5. The radio receiver of claim 4, including a counter for counting data lines per data field, said counter being reset to a prescribed count in response to said pulsed match filter responses.

6. A radio receiver for receiving a digital TV signal, which said digital TV signal includes pseudo random sequences in data field synchronization codes, with a respective data field synchronization code at the beginning of each of a plurality of successive data fields, and which said digital TV signal includes symbol codes of various amplitudes in the rest of each of said successive data fields, said radio receiver comprising:

a tuner supplying an analog intermediate-frequency carrier modulated in accordance with said digital TV signal, said analog intermediate-frequency carrier having an envelope exhibiting amplitude variations in response to said pseudo random sequences and to said symbol codes;

an analog-to-digital converter responsive to said analog intermediate-frequency carrier generating a digitized intermediate-frequency carrier;

an envelope detector operating in the digital regime to detect the amplitude of said envelope amplitude variations to supply an envelope detector response, said digitized intermediate-frequency carrier being supplied to said envelope detector as an input signal thereto; and a field match filter receiving as its input signal said envelope detector response and generating a respective pulsed match filter response each time amplitude variation in response to said pseudo random sequences occurs in said envelope detector response, which pulsed match filter responses are used by the radio receiver for symbol synchronization.

7. A radio receiver as set forth in claim 6, said synchronous detection circuitry comprising:

an adjustable delay circuit within said symbol synchronization circuitry for generating a delayed response to said digitized intermediate-frequency carrier, which said delayed response exhibits delay that is controlled by said pulsed match filter responses; and digital circuitry for synchrodyning said delayed response to baseband, thereby to recover said digital TV signal.

8. A radio receiver as set forth in claim 7, said envelope detector essentially consisting of an absolute-value circuit.

9. A radio receiver for receiving a digital TV signal, which said digital TV signal includes pseudo random sequences in data field synchronization codes, with a respective data field synchronization code at the beginning of each of a plurality of successive data fields, and which said digital TV signal includes symbol codes of various amplitudes in the rest of each of said successive data fields, said radio receiver comprising:

a tuner supplying an analog intermediate-frequency carrier modulated in accordance with said digital TV signal;

an analog-to-digital converter digitizing said analog intermediate-frequency carrier received as its input signal, to generate as an output signal therefrom a stream of digital data samples responsive to said analog intermediate-frequency carrier;

an envelope detector ascertaining the absolute values of each of said digital data samples to generate a stream of corresponding rectified digital data samples, ones of which said rectified digital data samples are descriptive of the amplitude of the intermediate-frequency carrier being modulated in accordance with the field synchronization code group; and a match filter receptive of said rectified digital data samples and responsive to those of said rectified digital data samples descriptive of the amplitude of the intermediate-frequency carrier being modulated in accordance with the field synchronization code group to generate a pulsed match filter response to the beginning of each data field.

10. The radio receiver for receiving said digital TV signal as set forth in claim 9, said radio receiver further comprising:

a clock signal generator generating at least a first digital clock signal applied to said analog-to-digital converter for controlling the timing of sampling for analog-to-digital conversion;

circuitry responsive to said pulsed match filter response for adjusting the timing relationship of said first digital clock signal and said analog intermediate-frequency carrier; and digital TV signal detection circuitry, responsive to said first digital clock signal and to said digitized intermediate-frequency carrier, for detecting said digital TV signal and supplying samples of said digital TV signal timed in accordance with said first digital clock signal.

11. The radio receiver for receiving digital TV signals set forth in claim 10, said digital TV signal detection circuitry comprising:

digital circuitry for synchrodyning said delayed response to baseband, thereby to recover said digital TV signal.

12. The radio receiver for receiving digital TV signals set forth in claim 9, said radio receiver further comprising:
- a threshold detector supplying a threshold detector response to those portions of said pulsed match filter response having an amplitude that exceeds a prescribed threshold value;
- a delay line having an input tap to which said threshold detector response is applied, having an output tap and having a middle tap, the delay of a delayed threshold detector response at said middle tap respective to said threshold detector response as applied to said input tap being the same as the delay of a further delayed threshold detector response at said output tap with respect to said delayed threshold detector response at said middle tap;
- circuitry for comparing the amplitude of delayed threshold detector response at said delay line middle tap with the amplitude of said threshold detector response as applied to said delay line input tap and with the amplitude of said further delayed threshold detector response at said delay line output tap, each as augmented by a prescribed offset value; and
- circuitry for generating a pulse when the amplitude of delayed threshold detector response at said delay line middle tap exceeds both the amplitude of said threshold detector response as applied to said delay line input tap and the amplitude of said further delayed threshold detector response at said delay line output tap.

13. The radio receiver for receiving digital TV signals set forth in claim 12, said radio receiver further comprising:
- circuitry for differentially combining said threshold detector response as applied to said delay line input tap and said further delayed threshold detector response at said delay line output tap to generate a differential response;
- a latch responsive to said pulse for latching said differential response; and circuitry; and
- circuitry responsive to the latched differential response for controlling the timing of sampling of said analog intermediate-frequency carrier modulated in accordance with a digital TV signal during its digitization by said analog-to-digital converter.

14. A radio receiver for receiving digital TV signal, which said digital TV signal includes pseudo random sequences in data field synchronization codes, with a respective data field synchronization code at the beginning of each of a plurality of successive data fields, and which said digital TV signal includes symbol codes of various amplitudes in the rest of each of said successive data fields, said radio receiver comprising:
- a tuner supplying an analog intermediate-frequency carrier modulated in accordance with a digital TV signal;
- an adjustable delay line delaying said analog intermediate-frequency carrier, the delaying being in an amount adjustable in response to a control signal, thereby generating an adjustably delayed response to said analog intermediate-frequency carrier;
- an analog-to-digital converter digitizing said adjustably delayed response to generate a stream of digital data samples;
- an envelope detector ascertaining the absolute values of each of said digital data samples to generate a stream of corresponding rectified digital data samples, ones of which said rectified digital data samples are descriptive of the amplitude of said adjustably delayed response to said intermediate-frequency carrier being modulated in accordance with the field synchronization code group; and
- a match filter, receptive of said rectified digital data samples and responsive to those of said rectified digital data samples descriptive of the amplitude of adjustably delayed response being modulated in accordance with the field synchronization code group, for generating a pulsed match filter response to the beginning of each data field.

15. The radio receiver for receiving digital TV signals set forth in claim 14, said radio receiver further comprising:
- synchronous detection circuitry connected for synchronously detecting said stream of digital data samples to recover said digital TV signal.

16. The radio receiver for receiving digital TV signals set forth in claim 14, said radio receiver further comprising:
- a threshold detector supplying a threshold detector response to those portions of said pulsed match filter response having an amplitude that exceeds a prescribed threshold value;
- a delay line having an input tap to which said threshold detector response is applied, having an output tap and having a middle tap, the delay of a delayed threshold detector response at said middle tap respective to said threshold detector response as applied to said input tap being the same as the delay of a further delayed threshold detector response at said output tap with respect to said delayed threshold detector response at said middle tap;
- circuitry for comparing the amplitude of delayed threshold detector response at said delay line middle tap with the amplitude of said threshold detector response as applied to said delay line input tap and with the amplitude of said further delayed threshold detector response at said delay line output tap, each as augmented by a prescribed offset value; and
- circuitry for generating a pulse when the amplitude of delayed threshold detector response at said delay line middle tap exceeds both the amplitude of said threshold detector response as applied to said delay line input tap and the amplitude of said further delayed threshold detector response at said delay line output tap.

17. The radio receiver for receiving digital TV signals set forth in claim 16, said radio receiver further comprising:
- circuitry for differentially combining said threshold detector response as applied to said delay line input tap and said further delayed threshold detector response at said delay line output tap to generate a differential response;
- a latch responsive to said pulse for latching said differential response; and
- circuitry responsive to the latched differential response for generating said control signal in response to which said adjustable delay line adjusts its delay of said analog intermediate-frequency carrier modulated in accordance with a digital TV signal when generating said adjustably delayed response thereto.

18. The radio receiver for receiving digital TV signals set forth in claim 17, said circuitry responsive to the latched differential response for generating said control signal comprising:
- an infinite-impulse-response digital lowpass filter receiving said latched differential response as input signal and generating a lowpass response; and
- a read-only memory addressed by said lowpass response of said infinite-impulse-response digital lowpass filter for supplying said control signal.

19. The radio receiver for receiving digital TV signals set forth in claim 17, said radio receiver further comprising:

a clock generator generating a symbol clock applied to said analog-to-digital converter for controlling the timing of sampling of said adjustably delayed response to said analog intermediate-frequency carrier during its digitization by said analog-to-digital converter;

a counter counting said symbol clocks to generate a count thereof;

a read-only memory addressed by said count for generating digital representations of what said analog intermediate-frequency carrier should be;

circuitry for converting said stream of digital data samples generated by said analog-to-digital converter to respective complex samples of said adjustably delayed response to said analog intermediate-frequency carrier;

circuitry for synchrodyning said complex samples of said adjustably delayed response to said analog intermediate-frequency carrier, together with the digital representations of what said analog intermediate-frequency carrier should be as generated by said read-only memory, for generating complex baseband samples; and circuitry responsive to at least the imaginary portions of said complex baseband samples for supplying said tuner an automatic frequency and phase control signal for controlling the phase and frequency of said analog intermediate-frequency carrier that is supplied from said tuner.

20. A radio receiver for receiving digital TV signal, said digital TV signal including pseudo random sequences in data field synchronization codes, with a respective data field synchronization code at the beginning of each of a plurality of successive data fields, and which said digital TV signal includes symbol codes of various amplitudes in the rest of each of said successive data fields, said radio receiver comprising:

a tuner supplying an analog intermediate-frequency carrier modulated in accordance with said digital TV signal, said modulated analog intermediate-frequency carrier having an envelope exhibiting amplitude variations in response to said pseudo random sequences and to said symbol codes;

an envelope detector detecting the amplitude of said envelope amplitude variations to supply an envelope detector response;

a field match filter receiving as its input signal said envelope detector response and generating a respective pulsed match filter response each time amplitude variations in response to said pseudo random sequences occur in said envelope detector response; and synchronous detection circuitry connected for synchronously detecting said analog intermediate-frequency carrier to recover said digital TV signal, said synchronous detection circuitry including symbol synchronization circuitry controlled by said pulsed match filter responses.

21. A radio receiver as set forth in claim 20, said synchronous detection circuitry comprising:

an adjustable delay circuit within said symbol synchronization circuitry for generating a delayed response to said analog intermediate-frequency carrier, said delayed response exhibiting a delay that is controlled by said pulsed match filter responses;

an analog-to-digital converter responsive to said delayed response for generating a digitized adjustably delayed intermediate-frequency carrier; and digital circuitry for synchrodyning to baseband said digitized adjustably delayed intermediate-frequency carrier to recover said digital TV signal.

22. A radio receiver as set forth in claim 20, arranged for receiving a suppressed carrier modulated in accordance with said digital TV signal, said suppressed carrier having amplitude modulation by said pseudo random sequences and by said symbol codes, said amplitude modulation being accompanied by a pilot carrier of amplitude smaller than the amplitude modulation of said carrier by said pseudo random sequences which pilot carrier causes said tuner, for supplying analog intermediate-frequency carrier modulated in accordance with said digital TV signal, to have said envelope exhibiting amplitude variations in response to said pseudo random sequences.

23. A method of receiving digital TV signal represented by an amplitude modulated suppressed carrier, said digital TV signal having a plurality of successive data fields each including a respective data field synchronization code at the beginning thereof, said digital TV signal including symbol codes of various amplitudes in the rest of each of said successive data fields, said amplitude modulated suppressed carrier including a pilot carrier, said pilot carrier having a frequency equal to a frequency of said suppressed carrier and an amplitude relatively small as compared to said amplitude modulated suppressed carrier during the transmission of said data field synchronization code, said method comprising steps of:

converting said amplitude modulated suppressed carrier, according to a selected channel frequency of a tuner, into an intermediate-frequency output signal of said tuner, said intermediate-frequency output signal having, owing to the accompanying pilot carrier, an envelope exhibiting amplitude variations in response to said data field synchronization codes;

detecting said envelope of said intermediate-frequency output signal of said tuner, and in response to said amplitude variations, outputting a baseband response including reproduced data field synchronization codes; and filtering said baseband response in a field match filter, and generating a respective pulsed match filter response each time a prescribed portion of said reproduced data field synchronization codes occurs, said pulsed match filter responses being used for symbol synchronization.

24. The method as set forth in claim 23, said step of detecting said envelope of said intermediate-frequency output signal of said tuner comprising steps of:

delaying said intermediate-frequency output signal of said tuner, wherein said delaying step is adjustable;

lowpass analog filtering the delayed intermediate-frequency output signal to generate a lowpass analog filter response;

sampling the lowpass analog filter response to produce digital samples representative of the intermediate-frequency output signal; and rectifying said digital samples to provide envelope detection.

25. The method as set forth in claim 24, further comprising steps of:

suppressing smaller-valued ones of said respective pulsed match filter responses;

detecting peaks in said respective pulsed match filter responses after performing said suppressing step;

determining difference values by comparing the digital samples on either side of the detected peaks and storing the difference values;

integrating, by an infinite-impulse response digital low-pass filter, the difference values to generate a read only memory (ROM) addresses;

outputting control values from a read only memory (ROM) in response to said read only memory (ROM) addresses; and adjusting the delay of a delay filter performing the step of delaying said intermediate-frequency output signal of said tuner, said delay filter being a tapped delay line and each respective control value output from said read only memory (ROM) enables a respective one of the taps of said tapped delay line.

26. The method as set forth in claim 25, further comprising steps of:

generating a digital clock signal for controlling the timing of said sampling step; and adjusting the timing of said digital clock signal in response to said pulsed match filter responses.

* * * * *